United States Patent Office 3,257,162
Patented June 21, 1966

3,257,162
INHIBITION OF VOLATILIZATION OF AQUEOUS ORGANIC MIXTURES
Robert P. Cox, Madison, Wis., assignor to Omega Chemicals Corporation, a corporation of Maryland
No Drawing. Filed Dec. 12, 1961, Ser. No. 158,882
33 Claims. (Cl. 21—60.5)

This invention relates to the retardation or suppression of the volatilization of aqueous solutions of normally volatile organic substances and to the resultant non-volatile compositions. More particularly, this invention relates to the process of retarding the volatilization of aqueous solutions of organic compounds by the addition thereto of glycol esters, glcol amides and ethoxylated of ethoxyethylated derivates thereof and to the non-volatile compositions so formed.

It has been suggested to employ certain fatty alcohols, such as cetyl and stearyl, which do decrease the evaporation of water to some extent, to inhibit the evaporation of organic liquids such as benzene, styrene, acetone, methanol, etc., and aqueous mixtures thereof. It was found that such fatty alcohols actually accelerated evaporation of organic liquids and their aqueous mixtures because their surface activity caused a phenomenon known as "wicking" in the composition, i.e., increasing the effective surface area of volatile organic liquid available to evaporate.

Somewhat more success has been achieved with physical methods of volatilization retardation. Such methods include employing special tanks and containers for holding and storing volatile organic material, floating hallow spheres of inert material on the surface of volatile organic liquids, floating a layer of foam on the surface of a volatile liquid, and interposing an incompatible, non-volatile liquid or solid barrier layer between the organic volatile material to be protected and the atmosphere. All of these methods are clumsy and of extremely limited applicability.

Quite recently, in U.S. Patent 2,764,603, it has been disclosed that the compound N,N-dimethyl-N'-perfluoro-caproyl-(propylene-1,3-diamine), in minute proportions, will inhibit the evaporation of volatile hydrocarbons, such as gasoline. While quite effective with gasoline-type hydrocarbons, this compound does not retard volatilization of other common volatile organic compounds. Moreover, in actual operation, it builds up a foam layer at the surface so that the net effect is a physical method of evaporation retardation which is of limited applicability.

Accordingly, it is an object of this invention to provide a chemical method for suppressing the volatilization of mixtures of water and volatile organic substances.

It is a further object of this invention to render aqueous solutions of volatile organic substances stable to volatilization during shipping and storage.

Still another object of this invention is the preparation of non-volatile, stable, aqueous solutions from water and highly volatile organic substances.

A further object of this invention is to increase the ease and economy of handling and storing aqueous solutions of volatile organic compounds by incorporating therein a small amount of a volatilization retardant which acts to reduce evaporation of both components of the mixture.

A specific object of this invention is the production of stable, non-volatile, aqueous solutions of normally volatile organic substances by the simple expedient of admixing therewith a small amount of a readily available stabilizer selected from a particular group of glycol esters, glycol amides, and certain ethoxylated or ethoxyethylated derivates thereof.

Another specific object of the invention is to render aqueous solutions of normally volatile organic substances so stable that they can be handled and stored without elaborate precautions by the simple expedient of incorporating therein a small amount of a readily available stabilizer selected from a particular group of glycol esters, glycol amides and certain ethoxylated or ethoxyethylated derivates thereof.

Yet another object of this invention is the production of stable, aqueous solutions of normally volatile organic substances of uniform concentration.

Another object of this invention is to provide a method of maintaining aqueous solutions of normally volatile organic substances at uniform stable concentration throughout periods of shipping and storage.

Other and further objects will appear from the ensuing detailed description.

Generally described, the objects of this invention are attained by the use, as stabilizer and volatilization retardant for aqueous solutions of organic substances, of a glycol ester, glycol amide or an ethoxylated or ethoxyethylated derivative thereof, having one of the following general formulae:

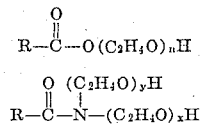

In the formulae, R represents an alkyl or an alkylene radical having from about 8 to about 32 carbon atoms, $n$ is an integer of from 1 to 60, and $x+y$ is the sum of two positive integers and equals from 0 to 60.

As represented above, R is intended to include saturated and unsaturated hydrocarbon radicals which contain no more than two double bonds and may, but preferably do not, contain some halogen substitution. If R has a value below about 8 carbon atoms, effective inhibition of volatilization is not achieved. The invention contemplates a value for R in the range of from about 8 up to about 32 carbon atoms.

While it will be recognized that not all R values are equally effective with all aqueous solutions, R values higher than 32 carbon atoms, such as up to 40 or more carbon atoms, are effective with certain solutions, and the upper limit of R is conditioned more upon the availability of compounds embodying radicals higher than $C_{32}$ than upon their efficacy in retarding volatilization.

Among the many suitable R radicals are the natural and synthetic fully saturated hydrocarbon radicals and admixtures thereof, the unsaturated natural and synthetic hydrocarbon radicals, the alkyl radicals derived from fats, fatty oils, fatty acids, etc. To exemplify more specifically, suitable embodiments of R include, e.g., octyl, nonyl, decyl undecyl, dodecyl tridecyl, cetyl, ceryl, eicosyl radicals derived from various synthetically produced $C_{20}$ to $C_{32}$ hydrocarbons, octenyl, octadienyl, dodecenyl, dodecadienyl, hexadecenyl, hexadecadienyl and the like. Further suitable embodiments of R include decylenyl, dodecylenyl, hentriacontanyl, heptacosyl, octacosyl, hexacosyl dotriacontanyl, phytadienyl, phytyl, triacontanyl, myricyl, monacosyl, melissyl, pelargonyl, and like radicals. Further examples of R include the alkyl mixed radicals derived from various fats and oils, etc., such as sperm oil, train oil, whale oil, lard oil, neat's-foot oil, olive oil, cottonseed oil, red oil, perilla oil, babassu oil, palm-kernel oil, castor oil, peanut oil, rapeseed oil, palm oil, coconut oil soybean oil, oiticaca oil, tung oil, linseed oil, corn oil, tallow, fish oils including cod oil, herring oil, pilchard oil, sardine oil etc., hydrogenated tallow, hydrogenated corn oil, tall oil and hydrogenated tall oil, as well as alkyl radicals derived from synthetically produced mixed acids having an average number of carbon atoms in the range of from about 8 to about 32.

The amount of additive necessary to achieve the desired result will, of course, vary with the particular organic material to be stabilized and the particular additive employed. Not all inhibitors are equally effective with all volatile organic compounds. In general, the effective amount of inhibitor to be added will be from about 0.005% to about 10% by weight based on the volatile organic material. A preferred range for the stabilizer is from about 0.10% to about 5.0% by weight of the volatile organic material.

It has been found that aqueous solutions of water-soluble, volatile organic compounds, generally, may be rendered stable to volatilization by the practice of this invention.

Among specific materials, the aqueous mixtures of which are rendered substantially non-volatile by treatment according to this invention are glyoxal, pyruvaldehyde, acetaldehyde, chloral, bromal, aldol, acetone, methyl ethyl ketone, methyl propyl ketone, methyl vinyl ketone, naphthoquinone, toluquinone, 2,6-dichloroquinone, acetonitrile, acrylonitrile, pyruvonitrile, dipropylamine, dibutylamine, diallylamine, morphline, propylenediamine, ethylenediamine, monobutylamine, trimethylamine, cadaverine, putrescine, allylamine, amylamine, isopropylamine, picoline, piperazine, pipecoline, piperidine, pyridine, pyrazine, pyrrole, pyrimidine, ethylpyrrole, methylpyrrole, trimethylenimine, formaldehyde, acetaldehyde oxime, 1-aminoethanol, acetamide, thioacetamide, acetic acid, methoxylacetic acid, mercaptoacetic acid, thioacetic acid, trifluoroacetic acid, acetoacetic acid, acetol, beta-ketoglutaric acid, 2-furylacetonitrile, alpha-hydroxyacetophenone, acetoxime, acroelin, acrylic acid, 2-chloroacrylic acid, allyl alcohol, allylamine, anabasine, benzenesulfonic acid, ortho-nitribenzenesulfonic acid, ethylboric acid, and the like.

Similarly, the stability of aqueous solutions of the following is also improved by the practice of the invention: acetylene, butadiyne, 2-amino butanol, vinylacetic acid, methallyl alcohol, butylsulfuric acid, alpha-ketobutyric acid, diethylcarbamic acid, cyanogen bromide, cyanogen chloride, cyclohexanedione, cyclopentanone, diethylnitramine, dimethylamine, dimethylnitramine, dioxane, 2-methyl dioxolane, ethylnitrate, 2-aminoethanol, 2-bromoethyl acetate, 2-chloroethanol, 2-fluoroethanol, 2-nitroethanol, butyl methyl ether, ethyl isopropyl ether, ethyl methyl ether, ethyl propyl ether, ethoxyamine, ethyl alcohol, ethylene oxide, ethylenimine, diethyl ether, ethyl isocyanide, ethyl sulfoxide, formamide, formic acid, ethyl formate, tetrahydrofuran, ethylene dithiocyanate, methyl hexynol, benzylhydrazine, methylhydrazine, N-benzylhydroxylamine, N-ethylhydroxylamine, N-phenylhydroxylamine, isethionic acid, acetone cyanohydrin, isopropyl alcohol, 2,5-dimethylpyrazine, methylal, methanol, methyl sulfoxide, 1-naphthalenesulfonic acid, nitroform, dimethyl phosphinic acid, propargylic acid, propionic acid, propyl alcohol, propargyl alcohol, pyrrolidine, pyrrolidone, pyrroline, pyruvic acid, 2-aminothiophene, triethylamine, triethanolamine, trimethylamine, ethylurea, methylurea, aminovaleric acid, hydroxyvaleric acid, etc. It will be recognized that aqueous solutions of many volatile organic materials that are gaseous at ambient temperatures gain improved stability when treated according to the invention.

When aqueous mixtures of organic compounds normally characterized by odors are treated according to this invention, it will, of course, be recognized that suppression of the characteristic odor will occur to the same extent that suppression of the volatilization of the mixture takes place.

The operation of this invention finds particular usefulness in laboratories, both industrial and those conducted on a small scale, and in industrial plants wherein the use of aqueous mixtures of substances as methanol, acetone, isopropanol, methyl ethyl ketone, etc., are desirably employed. Additionally, this invention is particularly applicable to the stabilization of commonly sold water mixtures, such as, e.g., commercial rubbing alcohol and the like.

While some of the additives employed according to this invention to inhibit the volatilization of aqueous solutions of volatile organic materials are also effective to some extent with the corresponding pure volatile organic materials, they are much more effective as inhibitors for aqueous mixtures, as will be shown in the ensuing examples. It is interesting to note that the effectiveness of the additives of this invention with pure solvents increases with increasing atmospheric humidity. It is theorized that this is due to condensation of some atmospheric moisture by evaporative cooling whereby a solution of water in the organic substance is formed, thus causing the resultant inhibited mixture to consist of the organic material plus water rather than the organic material alone.

The mechanism by which the additives of this invention operate to suppress the volatilization of aqueous organic solutions is not completely understood. It does appear that the additive functions in some way to form a very thin protective surface layer. The layer can be disrupted by mechanical agitation, with ultrasonic vibration, spraying, and similar forces. Immediately upon cessation of the application of such a force, however, the protective layer "mends" itself.

It is pointed out that not all specific additives are equally effective with all particular mixtures of water and organic substances. The effectiveness of any given additive appears to be a function of the concentration of the solution, as well as of the particular organic material present. It is thus seen that by suitable selection of additive and aqueous solution a system can be designed in which pure components may be obtained by evaporative distillation. This feature of the invention will, of course, find particular application with water azeotropes of organic materials, wherein separation of the components by simple rectification has been exceedingly difficult.

Having generally described the invention, the following examples are given by way of specific illustration:

*Examples 1–8*

Using Ethomids HT–15 and HT–60 (Armour Chemical Co.), which have the general formula

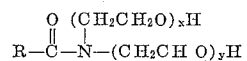

in which R has the composition

| | Percent |
|---|---|
| Hydrogenated myristyl | 2.0 |
| Hydrogenated palmityl | 32.5 |
| Hydrogenated stearyl | 14.5 |
| Hydrogenated oleyl, and | 48.3 |
| Hydrogenated linoleyl | 2.7 | and $(x+y)$ is 5 for HT–15 and 50 for HT–60, tests were made employing the additive in 1% concentration in each of the following solutions, by weight:

(A) 95% methanol–5% water
(B) 95% acetone–5% water
(C) 95% isopropanol–5% water
(D) 95% methyl ethyl ketone–5% water In each case, the solution containing 1% additive were compared with a control solution containing no additive.

A 10-gram sample of each was weighed out into an aluminum dish of 4 sq. in. cross-sectional area and exposed to ambient atmospheric conditions, weighings being made at 6 and 16 hours, respectively. From the weighings, the steady state evaporation rates, expressed as g.lost/hr./sq. in, exposed surface area, were calculated.

The evaporation ratio of the unmodified solution to that of the solution containing inhibitor was then calculated. The results are set forth below:

| Example | Solution | Additive | Evaporation Ratio (Pure Solution) (Modified Solution) |
|---|---|---|---|
| 1 | A | Ethomid HT-15 | 10.1 |
| 2 | B | do | 7.8 |
| 3 | C | do | 12.3 |
| 4 | D | do | 14.7 |
| 5 | A | Ethomid HT-60 | 18.5 |
| 6 | B | do | 16.6 |
| 7 | C | do | 15.7 |
| 8 | D | do | 11.9 |

*Examples 9–14*

To illustrate the marked superiority of the Ethomids with pure organic substances under high humidity conditions, 1% solutions in methanol were prepared and handled as in Examples 1–8, under the indicated controlled relative humidity conditions. The results are set forth below:

| Example | Additive | Relative Humidity | Steady State Evaporation Rate (g. lost/hr./sq. in. exposed surface area) |
|---|---|---|---|
| 9 | Ethomid HT-15 | 0 | 1.70 |
| 10 | do | 65 | 0.24 |
| 11 | do | 100 | 0.20 |
| 12 | Ethomid HT-60 | 0 | 1.65 |
| 13 | do | 65 | 0.12 |
| 14 | do | 100 | 0.10 |
| Control | No Additive | 0 | 2.07 |
| Do | do | 65 | 1.95 |
| Do | do | 100 | 1.89 |

*Example 15*

A 50:50 molar mixture of water and acetone was prepared. To a 9.9 sample of this solution in an aluminum dish of 4 sq. in. cross-sectional area was added 0.1 g. of diglycol stearate. After 24 hours exposure to ambient atmospheric conditions, the concentration of the solution was determined to be 30% water and 70% acetone.

*Examples 16–23*

In order to illustrate the usage of the present invention with aqueous azeotropic mixtures, 1% of each of the following materials were mixed with 99% of an 87.4–12.6 weight mixture of n-propanol and water. Ten grams of each of the resulting solutions were placed in aluminum dishes having a cross-sectional area of 4 sq. in. and allowed to evaporate in contact with the atmosphere. Results of weighting after 1 day and 2 days, respectively, are set forth below:

| Example | 1% Additive | Composition | Grams Remaining After— 1 day | 2 days |
|---|---|---|---|---|
| 16 | Adogen 60 | Cocoamide | 7.9 | 7.1 |
| 17 | Adogen 73 | Oleylamide | 7.8 | 7.1 |
| 18 | Amide B | Behenamide | 8.1 | 7.4 |
| 19 | Amide S | Stearamide | 6.25 | 4.9 |
| 20 | Ethomid HT-15 | As defined in Examples 1–8: $$R-\overset{O}{\underset{\|}{C}}-O(C_2H_4O)_nH;$$ $n=5; R-\overset{O}{\underset{\|}{C}}=oleyl$ | 6.9 | 6.0 |
| 21 | Ethofat 60/15 | | 5.85 | 4.1 |
| 22 | Polyethylene Glycol 200 Laurate | | 5.7 | 4.1 |
| 23 | Diglycol Stearate | | 5.5 | 3.95 |
| Control | No Additive | | 0.00 | 0.00 |

*Examples 24–26*

In order to determine the effect of the amount of additive present on its efficacy, the following series of experiments was performed using Amide B and the method of Examples 16–23:

| Example | Percent Amide B | Grams Remaining After— 1 day | 2 days |
|---|---|---|---|
| 24 | 1.0 | 8.0 | 7.4 |
| 25 | 2.0 | 9.1 | 8.9 |
| 26 | 3.0 | 9.2 | 8.95 |
| Control | 0.0 | 0.0 | 0.0 |

What is claimed is:

1. A substantially non-volatile aqueous mixture comprising a minor amount of water, a major amount of a water-soluble, normally volatile organic substance, and a sufficient amount to inhibit volatilization of the mixture of a volatilization inhibitor for said mixture, said inhibitor comprising a derivative of a fatty acid having an alkyl group containing from about 8 to about 32 carbon atoms attached to the carboxyl group, said derivative being selected from the group consisting of glycolesters, ethoxylated glycol esters and ethoxylated amides of said fatty acid, said ethoxylated derivative containing up to about 60 ethoxy groups per molecule.

2. The composition of claim 1 wherein the inhibitor is present in the amount of about 0.005% to about 10% by weight of the amount of volatile organic substance.

3. The composition of claim 2 wherein the inhibitor is present in the amount of from about 0.10% to about 5.0% by weight of the amount of volatile organic substance.

4. The composition of claim 1 in which the water-soluble, normally volatile organic substance is selected from the group consisting of lower alkanols and lower alkyl ketones.

5. The composition of claim 1 in which the inhibitor has the general formula

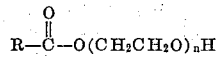

wherein R is an alkyl radical having from about 8 to about 32 carbon atoms and n is an integer of from about 1 to about 60.

6. The composition of claim 5 in which

is a stearyl group and n is 10.

7. The composition of claim 5 in which

is a mixture of acyl radicals comprising mainly lauryl and myristyl and n is 5.

8. The composition of claim 5 in which

is an oleyl group and n is 10.

9. The composition of claim 5 in which

is a stearyl group and n is 15.

10. The composition of claim 5 in which

is a mixture of acyl radicals comprising mainly lauryl and myristyl and n is 10.

11. The composition of claim 1 in which the inhibitor has the general formula $$\underset{R-\overset{O}{\overset{\|}{C}}-\overset{(C_2H_4O)_yH}{\underset{|}{N}}(C_2H_4O)_xH}{}$$

wherein R is an alkyl radical having from about 8 to about 32 carbon atoms, x and y are integers in the range of 0 to 60, and $(x+y)$ is in the range of 1 to about 60.

12. The composition of claim 11 in which $$R-\overset{O}{\overset{\|}{C}}-$$

is a mixture of acyl radicals obtained by hydrogenation of an acid mixture of the composition: 2.0% myristic, 32.5% palmitic, 14.5% stearic, 48.3% oleic, and 2.7% linoleic.

13. The composition of claim 12 in which $(x+y)$ is 5.
14. The composition of claim 12 in which $(x+y)$ is 50.
15. The composition of claim 11 in which the inhibitor is the amide of coco fatty acids.
16. A method for inhibiting the volatilization and stabilizing the concentration of an aqueous solution comprising a minor amount of water and a major amount of a water-soluble, normally volatile organic substance which comprises adding thereto at least about 0.005% by weight of said volatile organic substance of a volatilization inhibitor for said solution, the inhibitor being selected from the group consisting of $$R-\overset{O}{\overset{\|}{C}}-O(C_2H_4O)_nH$$

and $$\underset{R-\overset{O}{\overset{\|}{C}}-\overset{(C_2H_4O)_yH}{\underset{|}{N}}-(C_2H_4H)_xH}{}$$

wherein

R is selected from the group consisting of alkyl and alkenylene radicals having from about 8 to about 32 carbon atoms,
n is an integer of from about 1 to about 60, and
$(x+y)$ is the sum of two positive integers and equals from 0 to about 60.

17. The method of claim 16 wherein the inhibitor is added in the amount of about 0.005% to about 10% by weight of the amount of volatile organic substance.
18. The method of claim 17 wherein the inhibitor is added in the amount of from about 0.10% to about 5.0% by weight of the amount of volatile organic substance.
19. The method of claim 16 in which the water-soluble, normally volatile organic substance is selected from the group consisting of lower alkanols and lower alkyl ketones.
20. The method of claim 16 in which the inhibitor has the general formula $$R-\overset{O}{\overset{\|}{C}}-O(CH_2CH_2O)_nH$$

21. The method of claim 20 in which $$R-\overset{O}{\overset{\|}{C}}-$$

is a stearyl group and $n$ is 10.

22. The method of claim 20 in which $$R-\overset{O}{\overset{\|}{C}}-$$

is an oleyl group and $n$ is 10.

23. The method of claim 20 in which $$R-\overset{O}{\overset{\|}{C}}-$$

is a stearyl group and $n$ is 15.

24. The method of claim 20 in which $$R-\overset{O}{\overset{\|}{C}}-$$

is a mixture of acyl radicals comprising mainly lauryl and myristyl and $n$ is 10.

25. The method of claim 16 in which the inhibitor has the general formula $$\underset{R-\overset{O}{\overset{\|}{C}}-\overset{(C_2H_4O)_yH}{\underset{|}{N}}-(C_2H_4O)_xH}{}$$

26. The method of claim 25 in which $$R-\overset{O}{\overset{\|}{C}}-$$

is a mixture of acyl radicals obtained by hydrogenation of an acid mixture of the composition; 2.0% myristic, 32.5% palmitic, 14.5% stearic, 48.3% oleic, and 2.7% linoleic.

27. The method of claim 26 in which $(x+y)$ is 5.
28. The method of claim 26 in which $(x+y)$ is 50.
29. The method of claim 25 in which the inhibitor is the amide of coco fatty acids.
30. The method of claim 25 in which the inhibitor is selected from the group consisting of behenamide, stearamide and oleylamide.
31. The method of claim 25 in which the inhibitor is behenamide.
32. The composition of claim 4 in which the water:organic substance molar ratio is at least 50:50 and in which the water:organic substance weight ratio is a maximum of about 5:95.
33. The method of claim 19 in which the water:organic substance molar ratio is at least 50:50 and in which the water:organic substance weight ratio is a maximum of about 5:95.

References Cited by the Examiner

UNITED STATES PATENTS

| | | | |
|---|---|---|---|
| 2,438,038 | 3/1948 | Craver | 134—38 |
| 2,521,311 | 9/1950 | Schoegler et al. | 21—2.5 |
| 2,556,540 | 6/1951 | Henn et al. | 252—356 X |
| 2,739,870 | 3/1956 | Senkus | 21—2.5 |
| 2,739,871 | 3/1956 | Senkus | 21—2.5 |
| 2,822,238 | 2/1958 | Croft et al. | 21—60.5 |
| 2,831,815 | 4/1958 | Klisch | 252—152 |
| 2,890,928 | 6/1959 | Osipowe | 21—2.7 |
| 3,036,880 | 5/1962 | Malkemus | 21—60 |
| 3,095,381 | 6/1963 | Tinnon et al. | 252—171 |

OTHER REFERENCES

Zimmerman and Lavine, Handbook of Material Tradenames, pages 218 and 219, 1953 edition, Industrial Research Service Inc., Dover, N.H.

MORRIS O. WOLK, *Primary Examiner.*

LEON ZITVER, *Examiner.*

L. A. WEINBERGER, E. SZOKE, *Assistant Examiners.*